United States Patent
Schmidt et al.

(10) Patent No.: US 8,319,492 B2
(45) Date of Patent: Nov. 27, 2012

(54) ROTARY ENCODER

(75) Inventors: Jorgen Schmidt, Galten (DK); Morten Christiansen, Randers (DK); Hans Hilmar Dall, Ronde (DK)

(73) Assignee: Dall Production APS, Lystrup (DK)

( * ) Notice: Subject to any disclaimer, the term of this patent is extended or adjusted under 35 U.S.C. 154(b) by 297 days.

(21) Appl. No.: 12/682,347

(22) PCT Filed: Oct. 10, 2008

(86) PCT No.: PCT/GB2008/003421
§ 371 (c)(1),
(2), (4) Date: Jul. 27, 2010

(87) PCT Pub. No.: WO2009/047508
PCT Pub. Date: Apr. 16, 2009

(65) Prior Publication Data
US 2010/0301844 A1 Dec. 2, 2010

(30) Foreign Application Priority Data
Oct. 11, 2007 (GB) .................................. 0719950.8

(51) Int. Cl.
*G01B 7/30* (2006.01)
(52) U.S. Cl. ............... 324/207.25; 324/200; 324/207.23
(58) Field of Classification Search .................. None
See application file for complete search history.

(56) References Cited

U.S. PATENT DOCUMENTS

| | | | |
|---|---|---|---|
| 4,628,298 A | 12/1986 | Hafle et al. | |
| 6,314,355 B1 | 11/2001 | Mizuta et al. | |
| 6,380,536 B1 | 4/2002 | Inque et al. | |
| 6,900,793 B2 | 5/2005 | Goh et al. | |
| 7,427,860 B2 * | 9/2008 | Saito et al. | 324/207.25 |
| 7,466,125 B2 | 12/2008 | Heinze et al. | |
| 8,022,693 B2 * | 9/2011 | Meyersweissflog | 324/207.21 |
| 2003/0183024 A1 | 10/2003 | Lohberg et al. | |
| 2005/0156553 A1 | 7/2005 | Chun | |

FOREIGN PATENT DOCUMENTS

| | | |
|---|---|---|
| DE | 102005009489 A1 | 8/2006 |
| DE | 102006014700 A1 | 9/2007 |

* cited by examiner

*Primary Examiner* — Jermele M Hollington
*Assistant Examiner* — Trung Nguyen
(74) *Attorney, Agent, or Firm* — Katherine H. McGuire, Esq.; Woods Oviatt Gilman LLP

(57) ABSTRACT

A rotary encoder comprising a magnet, AMR or GMR sensors and an evaluation means. The AMR or GMR sensors are arranged to generate two signals that unambiguously encode the rotary position of the magnet within a predetermined range of rotary positions and a direction of rotation of the magnet. The evaluation means is arranged to derive single-turn and multi-turn information solely from the signals. The encoder is arranged to be switched to a power saving state for a predetermined period of time, to be at least partially reactivated thereafter and to compare a current value derived from the signals with a stored previous value derived from the signals.

8 Claims, 2 Drawing Sheets

ROTARY ENCODER

This application is a submission under 35 U.S.C. 371 and claims priority to PCT/GB2008/003421 filed 10 Oct. 2008 and United Kingdom Patent Application Ser. No. 0719950.8 filed 11 Oct. 2007.

FIELD OF THE INVENTION

The present invention relates to a rotary encoder. More specifically the present invention relates to a power saving mechanism for a rotary encoder. The present invention also relates to a way of correcting measurement inaccuracies in rotary encoders.

DISCUSSION OF THE PRIOR ART

Rotary encoders are in wide spread use and often form one of a large number of components required for the reliable operation and monitoring of mechanical systems. The failure of only one of the components of a large system may lead to the failure of the entire system. This is not only undesirable in terms of system down time but can also lead to damage to components of the system other than the encoder, of surrounding equipment or even to personal damage. It is thus a requirement that the components of large systems operate to the required accuracy over long periods of time with a minimum of cost in terms of maintenance. It may also be a requirement that such components operate if interruptions, such as a power failure, occur.

For this reason it may be desirable for components located remote from a central control unit to comprise a backup power supply that does not rely on transmission of energy from outside of the component. Rotary encoders are components that often need to be located close to a rotary axis that is to be monitored and it is thus desirable for such rotary encoders to comprise a back up power supply, such as a battery based back up power supply.

To extend the useful life of a battery based back up power supply without having to go to the expense of using rechargeable batteries and the associated required battery charging module, it is desirable to operate rotary encoders in a power saving manner.

A rotary encoder that can switch its microprocessor to a power saving state when the rotary axis to be monitored is not rotated is known from EP 1 617 180. The rotary encoder disclosed in this document comprises AMR or GMR sensors that register a change in the magnetic flux through the sensor created by the rotation of a magnet attached to a rotary axis and located in proximity of the sensors. This rotary encoder also comprises a wake up mechanism utilising two Reed switches located within the magnetic field created by the magnet in a manner that causes the Reed switch to switch when the magnet it rotated. A signal flank created by this switching action is used to re-activate the microprocessor. The use of mechanical components, such as Reed switches can, however, degrade the mean time to failure of the encoder and is thus undesirable.

SUMMARY OF THE INVENTION

According to an embodiment of the present invention, there is provided a rotary encoder for use in encoding the rotary position of a rotary member that is permitted to undergo a maximum acceleration. The rotary encoder comprises one or more sensors and encoder electronics. The one or more sensors are arranged to generate signals that unambiguously encode a rotary position of the member within a predetermined range of rotary positions of the member and to further unambiguously encode a direction of rotation of the member. The encoder electronics comprises means for converting the signals into a further signal indicative of the rotary position of the member. At least a part of the electronics is arranged to be switched to a power saving state in which the means does operate on the signals for a predetermined period of time. The duration of the predetermined period is selected so that the change in the rotational position of the member that can occur in the period is less than half of the predetermined range of rotary positions.

According to another embodiment of the present invention, there is provided a rotary encoder comprising a magnet, AMR or GMR sensors arranged to generate two signals that unambiguously encode the rotary position of the magnet relative to the sensors within a predetermined range of rotary positions and a direction of rotation of the magnet and an evaluation means arranged to derive single-turn and multi-turn information solely from the signals. The encoder is arranged to switch itself to a power saving state for a predetermined period of time, to at least partially reactivate itself after the predetermined period of time has passed and to compare a current value derived from the signals with a stored previous value derived from the signals.

As the encoder is arranged to reactivate itself after a predetermined period of time it is not necessary to monitor the field of the magnet while the encoder is in a power saving state. Instead, a rotation of the magnet while the encoder is in the power saving state is noticed when the encoder is re-activated. The present invention thus permits switching a large fraction of the encoder to a power saving state, including all of the encoder's sensors. This is beneficial in terms of reducing power consumption.

It is preferred that the encoder is configured for use with a rotary member that is permitted to undergo a maximum acceleration. The duration of the predetermined period is selected so that the change in the rotational position of the member that can occur in the period is less than half, more preferably less than a quarter of the predetermined range of rotary positions. At least some AMR or GMR sensors provide a sinusoidal output signal with two periods for each rotation of a magnet located adjacent to it. The predetermined range of rotary positions of the magnet is half a revolution of the magnet if such sensors are used.

It is further preferred that only the part of the encoder required for making the comparison is re-activated from the power saving state. This may include the sensors, means for digitising the signal received from the sensors and a part of the microprocessor required for making the comparison.

In a preferred embodiment two digitisation means are provided, one with a resolution that is lower than the resolution of the other one. The lower resolution digitisation means may be used to provide the current and previous values for comparison. This may mean that rotations of the magnet that are smaller than the resolution of the lower resolution digitisation means can go undetected. However, lower resolution digitisation means, such as a comparator arranged to compare a signal with a threshold value can have a lower power consumption than higher resolution digitisation means, such as analogue digital converters, which are the preferred higher resolution digitisation means. The above mentioned comparator is the preferred lower resolution digitalisation means. By relying on the lower resolution digitisation means for detecting a rotation that requires the encoder to be re-activated the amount of power required for comparing a current signal value to a previous, stored signal value is minimised.

This prolongs the life time of a back up power supply provided in the encoder. The exact amount of rotation performed by the magnet can be determined after reactivation of the encoder using the higher resolution digitisation means.

This has been recognised as being advantageous in its own right and in another embodiment there is provided a rotary encoder comprising a sensor and means for evaluating signals created by the sensor. A lower resolution digitisation means and a higher resolution digitisation means are provided. If the encoder is switched to a power saving mode, for example if the signals have not changed for a period of time, the lower resolution digitisation means is re-activated or used after a predetermined period of time and a current output of the lower resolution means is compared with a stored previous output of the lower resolution means. If the comparison indicates that the current and previous outputs differ, the higher resolution means is re-activated from a power saving state to evaluate the signal in more detail. The power saving mode can be such that the lower resolution digitisation means as well as the sensors are switched off. Alternatively the lower resolution digitisation means as well as the sensors may remain active in a power saving mode, while other parts of the encoder are de-activated.

The lower resolution means may also find use during an operation of the encoder in which the higher resolution means is used for evaluating the signal or signals in detail. During such use the output signal of the lower resolution digitisation means can be converted into a pulsed signal. This pulsed signal may form the basis for counting the number of revolutions performed by the magnet and may be transmitted to a remote location.

BRIEF DESCRIPTION OF THE DRAWINGS

The present invention will now be described by way of example only and with reference to the accompanying drawings, in which.

DETAILED DESCRIPTION OF PREFERRED EXAMPLES

The Structure of a Preferred Encoder

Figure 1:
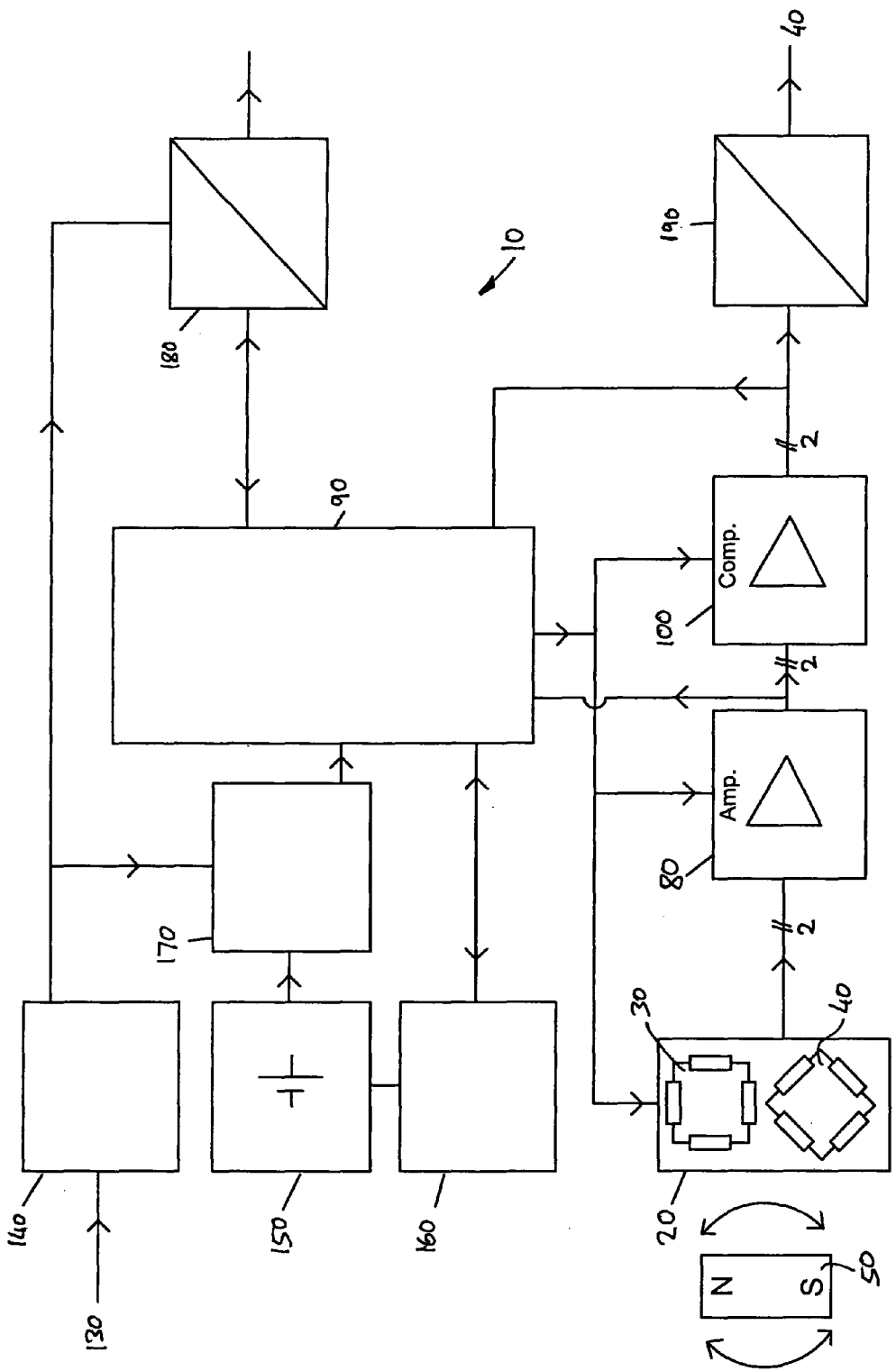
FIG. 1 shows a block diagram of the electronic circuit of a rotary encoder according to a preferred embodiment.

FIG. 1 shows a block diagram of the electronic circuit of a preferred embodiment of the rotary encoder 10. The encoder 10 detects the rotational position of an axis (not shown). For this purpose the encoder 10 employs an AMR or GMR sensor integrated circuit (IC) 20, such as a KMZ 43T sensor IC available from Phillips Semiconductors. This sensor IC 20 comprises two Wheatstone measurement bridges 30 and 40 that are physically offset against each other by 45 degrees. The measurement bridges 30 and 40 are supplied with power and provide a sinusoidal output signal that oscillates about a voltage that corresponds to half the voltage supplied to the measurement bridges 30 and 40. The output signals provided by the measurement bridges 30 and 40 are functions of the direction of the magnetic field surrounding the AMR/GMR elements that form the measurement bridges 30 and 40.

A magnet 50 is arranged proximate to the sensor IC. The magnet 50 is attached to the axis for which the rotational position is to be determined so that the magnet 50 rotates with the axis and so that the magnet's magnetic field at the measurement bridges 30 and 40 cyclically changes with the rotation of the axis.

Figure 2:
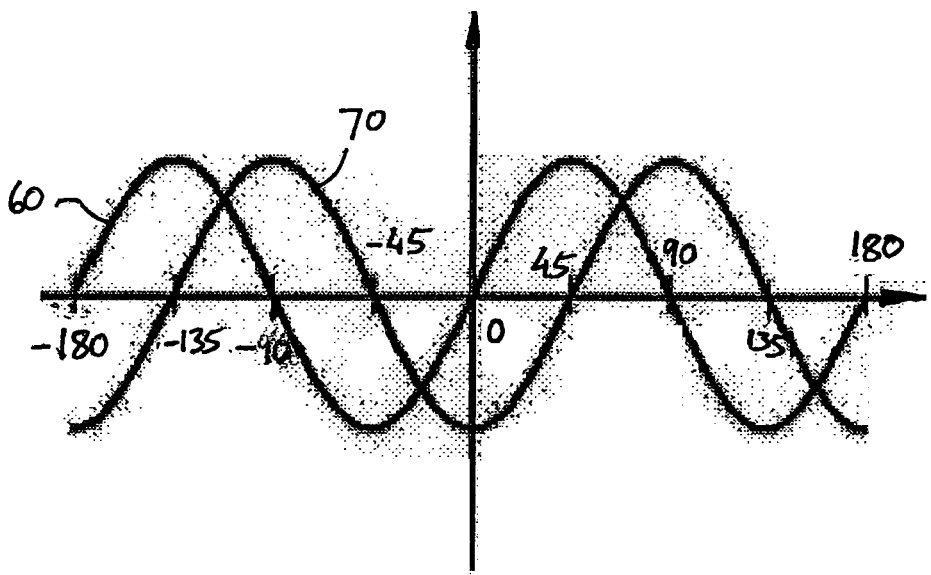
FIG. 2 shows signals generated by the sensors of the preferred embodiment shown in FIG. 1.

FIG. 2 shows exemplary signals at the output of the measurement bridges 30 and 40 as a function of the rotational position of the axis/magnet 50 relative to the sensor IC 20. The abscissa of FIG. 2 shows the angular position of the magnet 50 at which the illustrated output signal is generated. The ordinate of FIG. 2 shows the amplitude of the generated signal. Curve 60 illustrates the signal generated by the measurement bridge 30 and curve 70 illustrates the signal generated by the measurement bridge 40. As can be seen from FIG. 2, each measurement bridge provides a sinusoidal signal that is repeated twice for every rotation of the magnet 50. The 45 degree offset between the measurement bridges 30 and 40 manifests itself as a 90 degree phase offset between the signals 60 and 70.

Returning to FIG. 1, the output signals generated by the sensor IC 20 are input to an amplifier circuit 80. From the amplifier circuit 80 the signals 60 and 70 are input to a microprocessor 90 and a comparator circuit 100.

The comparator circuit 100 compares each of the signals 60 and 70 with predetermined voltages. The comparator generates a constant positive output voltage when the corresponding input signal is greater than the signal value it is compared to and a zero volt output if the input signal is smaller than the signal value it is compared to. The output signals of the comparators 100 are also supplied to the microprocessor 90.

Figure 3:
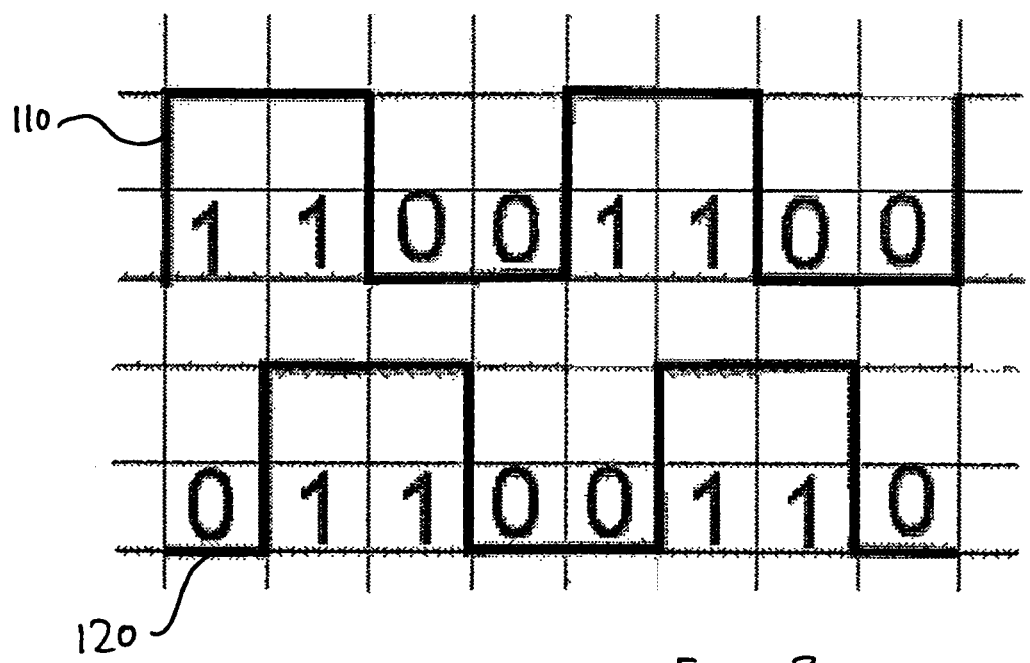
FIG. 3 shows output signals of a comparator stage operating on the signals shown in FIG. 2.

An example of the output signals generated by the comparators 100 is provided in FIG. 3. FIG. 3 depicts comparator signals 110 and 120 generated by the comparators 100 from the signals 60 and 70 respectively. Signal 110 changes between its high and low values every time signal 60 crosses the abscissa in FIG. 2. Signal 120 changes between its high and low value every time signal 70 crosses the abscissa in FIG. 2. The abscissa in FIG. 2 is provided at zero volt. The high and low states of signals 110 and 120 are interpreted as logical high and low states by the microprocessor. As can be seen from FIG. 3, if the magnet 50 is rotated by less than 45 degrees, at most one of the signals 110 and 120 changes its state. For example, if signal 110 changes from high to low, signal 120 remain unchanged unit the angular position of the magnet 50/axis has changed by approximately further 45 degrees. The fact that only one of the comparator signals changes its state for a small rotation of the magnet can be used for determining the direction of the magnet's rotation. The possible transitions signals 110 and 120 can undertake for a rotation of up to 45 degrees are listed in the following table.

|  | State after counter-clockwise rotation | Starting state | State after clockwise rotation |
|---|---|---|---|
| Signal 110 | 0 | 0 | 1 |
| Signal 120 | 1 | 0 | 0 |
| Signal 110 | 0 | 1 | 1 |
| Signal 120 | 0 | 0 | 1 |
| Signal 110 | 1 | 1 | 0 |
| Signal 120 | 0 | 1 | 1 |
| Signal 110 | 1 | 0 | 0 |
| Signal 120 | 1 | 1 | 0 |

From this table it can be seen that from a given starting state, if only one of the two signals 110 and 120 changes its state, the signals 110 and 120 can assume only two possible combinations of signal states. For example, if the signal 110 is at 'low'/0, and signal 120 is at 'high'/1, then only states 1/1 and 0/0 can be reached by changing one of the two states. It will be clear from the comparison of FIGS. 2 and 3 that a change from 0/1 to 0/0 indicates an increase in the angular position of the magnet 50/axis and a change from 0/1 to 1/1 a decrease in the angular position of the magnet 50/axis. In the preferred embodiment these increases and decreases correspond to clockwise and counter-clockwise rotations respectively. The sequence in which the comparator signals change can thus be used as an indicator for the direction of rotation of the magnet 50/axis.

Turning now to the way power is supplied to the elements of the encoder 10, a connection 130 through which an external power supply can be connected to a power regulator 140 is provided. A battery based backup power supply 150 is also provided. A test circuit 160 monitors the state of the battery and provides a failure indication to the microprocessor 90 if it is determined that the battery does not comprise sufficient charge to reliably supply backup power to the encoder 10. A power selector 170 switches from the external power supply 130/140 to the backup power supply 150 if power through the external power supply becomes unavailable and from the backup power supply 150 to the external power supply when power becomes available again through the external power supply 130/140 after an interruption.

The microprocessor 90 comprises analogue digital converters arranged to convert the analogue signals provided by the amplifiers 80 into digital signals for processing in the microprocessor 90. The signals provided by the comparators 100 do not need to be digitised as the microprocessor 90 recognises the two possible states that can be created by the comparators 90 as logical high and low values.

The microprocessor 90 generates an output signal that is indicative of the rotational position of the magnet 50 based on the output signals of the amplifiers 80 and the comparators 90. The manner in which this signal is generated will be described in more detail below. The output signal generated by the microprocessor 90 is provided to an output circuit 180. This output circuit converts the output signal generated by the microprocessor 90 into an output signal that can be transmitted to a remote location, for example to remote monitoring devices. In the preferred embodiment the signal provided by the microprocessor is converted into a standard RS485 communications signal by the output circuit 180. It should be noted that the output circuit 180 is not connected to the power selector 170 but only to the power regulator 140 that is responsible for providing power available through the external power supply.

In the preferred embodiment the microprocessor 90 is not only arranged to use the output circuit 180 as a means for communicating a signal indicative of the rotational position of the magnet 50/axis to a remote location. Instead the microprocessor 90 is further arranged to use the output circuit 180 to more generally communicate with a remote entity. Such communication may be useful in the context of servicing and maintenance of the encoder 10 where it may be necessary for the encoder to answer status enquiries directed to the encoder 10 from a remote entity through the circuit 180. Additionally the output circuit 180 may be used by the microprocessor 90 for sending error messages to a remote entity, for example a message that indicates a substantial depletion of the energy available from the backup power supply 150.

A further output circuit is provided in the form of a pulsed output circuit 190. This pulsed output circuit 190 operates solely on the signal power received from the comparators 100 and provides a rectangular output signal with four pulses per revolution of the magnet 50/axis. While the output signal provided by the output circuit 190 is not suitable for an exact determination of the angular position of the magnet 50/axis, it is nevertheless indicative of the rotational speed of the axis. The encoder 10 can thus provide an indication of the rotational speed of the magnet 50/axis to a remote unit even if the external power supply has failed or is otherwise unavailable.

The Operation of the Preferred Encoder

A discussion of the manner in which the microprocessor determines the angle of the magnet relative to the sensors IC 20 is provided in the following.

The angular position $\phi$ of the magnet 50 relative to the sensor IC 20 can be determined using the equation:

$$\phi = \tfrac{1}{2}\,\mathrm{atan}(A/B),$$

wherein A corresponds to signal 60 after offset correction and B corresponds to signal 70 after offset correction. Determining the angular position using the above equation is computationally intensive and requires a considerable amount of processing time in a simple microprocessor. Fast calculation of the angular position is, however, desirable for achieving a good response time with the encoder.

To avoid the expense associated with the use of higher performance microprocessors, the preferred encoder uses four look up tables (LUTs) for determining the angles from the signals provided by the amplifiers 80. The LUTs comprise an array of possible output values calculated for possible combinations of input values. Digitised versions of signals 60 and 70 are used to address the output values in the LUTs that have been calculated using equivalents of the signals 60 and 70. Each of these four tables provides output values for an eighth/45 degrees of the rotation of the magnet 50/axis.

The correct LUT is selected using the signals 110 and 120 and the known previous rotational position of the magnet 50/axis. As each combination of states of the signals 110 and 120 occurs twice for each rotation of the magnet 50/axis, each combination of states of the signals 110 and 120 can indicate two different ranges of rotational positions, each range spanning 45 degrees. Knowledge of the previous rotational position of the magnet 50/axis and observing a change in the signals 110 and 120 allows to conclude if the correct angular range is positioned to the left or to the right of the ordinate in FIG. 2. This allows selecting the correct LUT for determining the output value.

When the encoder 10 of the preferred embodiment is initialised, the rotational position of the magnet 50/axis is known. From this known position all subsequent positions can be calculated. It will be appreciated that the signals 110 and 120 are used by the preferred embodiment as a quick and readily available means for selecting the correct LUT. The microprocessor 90 comprises a memory section that is suitable for buffering the current values of signal 110 and 120 for use in determining to which angular range the axis has been turned.

Once the correct LUT has been chosen, digitised versions of the signals 60 and 70 are used to find the entry in the LUT associated with the signal values. The microprocessor 90 comprise analogue to digital converters for converting signals 60 and 70 to their digital equivalents. In the preferred embodiment a LUT entry corresponding to a particular combination of values of input signals 60 and 70 is found by repeatedly comparing the input values with values at the centre of the ranges of possible input values (or, after a first comparison has been completed, of remaining possible input values) and by deciding whether the input value is larger or smaller than the value is has been compared to. Using this method the range of LUT values an input value can possibly be associated with is halved for each comparison step. Using several comparison steps the LUT value associated with a given input value or with given input values can thus be determined and output. The output LUT value identifies the rotational position of the magnet 50 relative to the IC 20 and may, in one arrangement, take the form 32 bit output value encoding the rotational position of the magnet 50.

In a first comparison step, for example, the preferred embodiment decides whether or not a signal 60/70 is in the upper or lower half of all possible input signals. This limits the range of LUT entries that can possibly be associated with the input value to half of the original values. The preferred embodiment then determines whether the input value is in the upper or lower half of the remaining input signals. This again limits the range of LUT entries that can possibly be associated with the input value by a further half to one quarter of all of the original LUT entries. Further determinations are made until an input value is unambiguously associated with a LUT entry. It will be appreciated that the number of determinations that are required depends on the number of LUT entries and that these determinations will have to be made for both signals 60 and 70. This method allows making a rapid decision as to which of the LUT entries is the correct one to output.

The above manner of tracking the angular position of the magnet 50/axis assumes that each change in either of the signals 110 and 120 is detected by the microprocessor 90. As is the case with any encoder, the encoder 10 is suitable for use with axes rotating at a frequency that is less than a maximum rotation frequency. To ensure that this requirement is fulfilled, the microprocessor 90 is arranged to sample the signals 110 and 120 at least once in every period of time in which the magnet 50/axis can rotate by 45 degrees if it rotates at a maximum permissible frequency.

For the correct LUT to be selected it is very important for the flanks of the signals 110 and 120 to not suffer from any delays, so that they occur at the correct angular position. If this is not the case, then cases are likely in which an incorrect LUT is chosen for determining the angular position of the magnet 50/axis. This would inevitably lead to an incorrect determination of the angle of the magnet 50/axis. Commercially available comparators can display hysteresis behaviour that can cause the flanks in the output signal to occur at an angular position that deviates from the intended or ideal position. If this happens it is possible that an incorrect LUT is chosen for determination of the angular position of the magnet 50/axis.

To prevent this problem, the microprocessor 90 comprises a software routine that analyses the signals 60 and 70 and determines whether or not the comparator signals 110 and 120 should be 'high' or 'low' based on the criteria also applied to the comparators 100. This software routine thus acts as a software comparator and does not suffer from the delays the hardware comparators 100 may be suffering. If the software comparator routine determines that one of the signals 110 and 120 provided by the hardware comparators 100 is delayed, then the choice of the correct LUT is based on the determination made by the software routine.

For multi-turn applications the flanks of the signals 110 and 120 are also used to increment and decrement a counter provided in the microprocessor 90 to keep track of the number of revolutions the magnet 50/axis has undergone since the encoder 10 has been activated. If it is determined that the signals 110 and 120 are incorrect, for example due to hysteresis behaviour of the comparators 100, then the counter can be incremented or decremented based on the determination made by the software comparator.

In an alternative arrangement the output of a software comparator resident in the processor 90 is used to select the correct LUT for determining an output value representative of the rotational position of the magnet 50. The software comparator does not exhibit hysteresis behaviour and there is thus no danger of selection of an incorrect LUT. Counting of the revolutions undergone by the magnet may still be performed based on the hardware comparators 100. If it is desired that the output of the hardware comparators 100 is compared with that of the software comparators resident in the processor 90, then the relevant check only needs to be performed once per revolution, rather than every 45 degrees.

It will be appreciated that, without initialisation of the encoder it is not possible if the signal received by the sensor is in the positive or the negative angle range in FIG. 2. This is, however, inconsequential, given that, once initiated, the battery backed encoder can retain the relevant information throughout its lifetime. Moreover, initialisation can be conducted by a skilled technician upon installation or even following manufacture, so that no further changes in the configuration are required after set up of the encoder.

The Wake Up Function of the Preferred Embodiment

As discussed above, the encoder 10 comprises a battery based backup power supply 150. It is desirable that the lifetime of the battery is as long as possible, preferably in excess of ten years. It can also be imagined that the axis/magnet 50 may remain static for prolonged periods of time. A rotary encoder 10 used as an encoder for tracking the position of a moveable gate may, for example, only be required to track changing angular positions a few times per day, as is the case for encoders used in monitoring the opening and closing of gates and doors. This is a preferred use for the encoder of the present invention.

In periods of time in which the magnet 50/axis does not rotate most of the functions of the microprocessor are not needed. There is, for example, no need to determine the angular position of the magnet 50/axis if it is known that the magnet 50/axis has not moved substantially. Functions associated with the determination of the angular position of the magnet 50/axis may thus be disabled or switched to a power saving mode if the angular position of the magnet 50/axis is known not to change. It is then only required to monitor whether or not the angular position of the magnet 50/axis starts to change again after it has remained static for a period of time. In this case the entire encoder 10 can be re-activated to determine the new rotary position of the magnet 50/axis.

The microprocessor can monitor changes in the rotational position of the magnet 50/axis by comparing the current value of signals 60/70 or 110/120 with previous values. If signals 60/70 are used for this comparison, or indeed if the outputs of the software comparator are to form the basis for this comparison, then the analogue digital converter provided in the microprocessor 90 needs to remain active. For this reason the hardware comparators 100 are provided. As discussed above, they provide signals 110 and 120 to the microprocessor 90 that the microprocessor 90 recognises as digital signals. The comparators 100 thus provide a digitisation function, albeit at a low resolution of 45 degrees. The states of the signals 110 and 120 can be compared to previous states by the microprocessor 90. Only a very small fraction of the microprocessor's 90 functions need to remain activated for this purpose. This can considerably reduce the amount of power consumed by the encoder 10. Should a change in a state of a signal 110 or 120 be detected, then the entire microprocessor 90 can be re-activated, the output of the comparators 100 can be compared to the output of the re-activated software encoder and, if it is determined that the magnet 50/axis has moved, the new angular position of the magnet 50/axis can be determined.

The preferred embodiment achieves further power saving by further disabling the microprocessor 90 so that the only functions performed in a low power mode is the buffering of previous values of the signals 60, 70, 110 and 120 and to provide a routine that will reactivate part of the microprocessor 90 after a predetermined period of time so that the above discussed comparison between the previous values of signals 110 and 120 and potential altered values of these signals can be performed. After the predetermined period of time the preferred embodiment thus supplies power to the sensor IC 20, the amplifiers 80 and the comparators 90 and reactivates itself as far as necessary to perform the desired comparison. Once the comparison has been performed, should it have been determined that the magnet 50/axis has not rotated sufficiently to cause a change in the signals 110 and 120, the encoder can again be de-activated to only provide the buffering function and the routine that will reactivate the encoder 10 after the predetermined period of time has passed again.

As is the case for many rotary encoders, the rotary encoder of the preferred embodiment is only suitable for operations in association with axes that are accelerated by less than a maximum acceleration. For the above power saving routine to reliably operate the microprocessor is re-activated to be able to perform the required comparison between previous and current values of the signal 110 and 120 at least once in the period of time it would take the magnet 50/axis to undergo a 45 degree rotation if the magnet 50/axis starts to rotate from a stationary state at the maximum allowed acceleration.

Axes that can accelerate by up to 100 radians per $s^2$, for example, can undergo a rotation of 45 degrees in 88.6 ms. If the microprocessor 90 of an encoder does not compare the previous and current values of the signals 110 and 120 in this period of time, then it will no longer be possible to unambiguously determine the relative angular position of the magnet 50/axis with respect to the magnet's 50/axis' previous position. A rotary encoder 10 suitable for use with an axis of this type will thus have to reactivate the microprocessor 90 at least every 88.6 ms, assuming that the encoder 10 is only switched to a power saving state if the magnet 50/axis is static. It is of course more preferred that the microprocessor 90 is activated more frequently to provide a margin for error. A preferred rotary encoder for use with an axis that can accelerate at up to 100 rad/$s^2$ activates the microprocessor approximately every 15 ms. In this period of time the rotational position of the magnet 50/axis can change by a maximum of 1.3 degrees. The duration for which the microprocessor 90 needs to be activated to make the above discussed comparison need not be long and in the preferred encoder takes no longer than approximately 60 μs. This short period of time is sufficient for determining whether or not the rotational position of the axis/magnet 50 has changed.

While the above described power save mode is useful irrespective of whether or not external power supplied is available, the preferred encoder only switches to the power save mode if the external power supply is interrupted.

It will be appreciated that the above specific description was made by way of example only. This description is, however, not intended to be limiting and the scope of the present invention is determined solely by the accompanying claims.

The invention claimed is:

1. A rotary encoder comprising a magnet, AMR or GMR sensors arranged to generate two signals and means for evaluating the said two signal created by the sensors, the means for evaluating comprising two means for digitising the said two signals generated by the sensors, one of the two means arranged to provide a lower resolution digital representation of the said two signals than the other means, the encoder arranged to be switched to a power saving state for a predetermined period of time, to be at least partially re-activated after the predetermined period of time and to compare a current value derived from the signal with a stored previous value derived from the signal;
   wherein a magnetic field generated by the magnet is not monitored in the power saving state;
   wherein the encoder is arranged to, when partially activated, create a current digital representation of the said two signals using the lower resolution digitisation means, to compare the current digital representation of the signal with a stored previous digital representation of the said two signals, to reactivate further if the comparisons indicates that the current and previous digital representations differ and to create, using the higher resolution digitisation means when further activated, a digital representation of the said two signal having a higher resolution than the digital representation of the signal created when partially activated.

2. A rotary encoder according to claim 1, wherein the AMR or GMR sensors are arranged to generate the two signals so as to unambiguously encode the rotary position of the magnet within a predetermined range of rotary positions and a direction of rotation of the magnet; and
   an evaluation means arranged to derive single-turn and multi-turn information from the signals.

3. A rotary encoder according to claim 1, arranged to only reactivate a part of the encoder that is in the power saving state that is required for making the comparison.

4. An encoder according to claim 1, further comprising a means for transforming an output signal of the lower resolution digitisation means into a pulsed signal.

5. An encoder according to claim 1, wherein the lower resolution distribution means is a comparator.

6. An encoder according to claim 1, further comprising more than one look up table that stores output values, the rotary encoder arranged to use values derived from the two signal generated by the sensor to address entries in the look up tables, wherein a said value derived from the two signal generated by the sensor can address more than one look up table;
   the encoder arranged to address the look up table by a value determined based on
   a current value derived from the two signal and on a previous value derived from the signal.

7. An encoder as claimed in claim 6, further comprising a microprocessor arranged to conduct a further comparison between the two signal and the predetermined signal level, and to compare the output of the hardware comparator with the result of the comparison performed by the microprocessor, wherein the output of the comparator is not relied upon, if it differs from the comparison result generated by the microprocessor.

8. An encoder according to claim 1, wherein the digitisation means arranged to provide the lower resolution digital representation of the two signal is a hardware comparator or a software comparator, the digitisation means arranged to compare the two signal to a predetermined signal level and to generate an output indicative of whether the signals are higher or lower than the predetermined signal level, wherein the encoder is arranged to base a part of the determination on the output.

* * * * *